United States Patent [19]

Lieptz

[11] 3,902,382
[45] Sept. 2, 1975

[54] CALIBRATION GAUGE FOR KEY DUPLICATING MACHINE

[75] Inventor: Nathan S. Lieptz, Beachwood, Ohio

[73] Assignee: Curtis Noll Corporation, Cleveland, Ohio

[22] Filed: Mar. 14, 1974

[21] Appl. No.: 451,218

[52] U.S. Cl. ............... 76/110; 29/76 C; 33/174 F; 90/13.05
[51] Int. Cl.² ............... B21K 13/00; B23D 67/00; B23F 23/08; B23C 1/16
[58] Field of Search ...... 76/110; 29/76 C; 33/174 F; 90/13.05

[56] References Cited
UNITED STATES PATENTS

| | | | |
|---|---|---|---|
| 1,948,260 | 2/1934 | Fowler | 33/174 F X |
| 2,087,423 | 7/1937 | Abrams | 33/174 F |
| 3,791,240 | 2/1974 | Meoni | 76/110 |

*Primary Examiner*—Harrison L. Hinson
*Attorney, Agent, or Firm*—Isler & Ornstein

[57] ABSTRACT

A calibration gauge consisting of a hardened steel piece having parallel longitudinally-extending marginal edges for mounting in one of the key clamps of a key duplicating machine. The gauge is also provided with a shouldered portion and with notches or recesses of predetermined dimension to provide a limit gauging function. Upon proper manipulation of the key duplicating machine with a key blank mounted thereon, the calibration gauge tests the performance of the duplicating machine in terms of alignment and depth of cut, so as to permit adjustment thereof to commercial standards of performance.

1 Claim, 1 Drawing Figure

CALIBRATION GAUGE FOR KEY DUPLICATING MACHINE

BACKGROUND OF THE INVENTION

When additional keys or locks are required, it is customary to use a key duplicating machine to cut a proper key blank to correspond to the configuration of an already cut key which is mounted in the duplicating machine to serve as a pattern for the cuts being made in the new key. Various types and varieties of key duplicating machines or mechanisms are utilized for this purpose, such as, for example, the key duplicating machine disclosed in U.S. Pat. Nos. 3,116,665 and 3,286,596.

Although such key duplicating machines can and do take a variety of forms, they essentially embody certain basic characteristics which are common to the vast majority of such machines. A cutting or abrading wheel, which is rotatably mounted and usually power-driven, serves to cut the notches in desired sequence and to desired depth in the new key blank; a pivotally mounted rocker assembly, including two spaced key clamps or vises, is movable toward and away from the cutter wheel, either manually or by some form of powered or automatic control; a key guide or follower, having adjustable characteristics, is secured to the machine in position to engage the bit or stem of the original key which is mounted in one of the key clamps; an uncut key blank is mounted in the other clamp for selective engagement with the cutter wheel; a movable shoulder-stop serves to properly locate or position the key blank and the original key longitudinally in their respective clamps for proper duplication; the clamps are spaced from each other either laterally or vertically or in some combination of these two directions and the adjustable shoulderstop is customarily movable between both key clamps, although in some machines such a movable shoulder-stop is not or need not necessarily be used.

In operation of the key duplicating machine, the original key is placed in one of the clamps so that its cut edge is engageable with the fixed follower element as the rocker assembly traverses the cutter wheel. The key blank is placed in the other clamp with its shoulder properly located by the shoulder-stop or other suitable means so as to provide conicidence of engagement of the key blank with the cutter wheel at the same location or portion of its stem as the follower element likewise engages the same portion of the original or already cut key to be duplicated. As the rocker assembly traverses the cutter wheel carrying the two clamps with it, the normally fixed follower causes transverse displacement of the rocker assembly in opposition to spring means normally urging the rocker assembly toward the cutting wheel, this displacement being caused by the irregular contour of the bit edge of the original key and being duplicated by a corresponding displacement of the key blank toward and away from the cutting wheel as the rocker assembly continues its traversal movement. Upon completion of traversal, the pattern of cuts on the original key should be faithfully reproduced or duplicated on the cut key blank, which then may be exposed to a deburring or brushing wheel before it is removed from the key clamp.

In order to provide a commercially acceptable duplicate key, it is evident that the key duplicating machine must not only reproduce the contour of wards and cuts of the original key, but must also reproduce substantially the precise heighth of the wards and the depths of the cuts, as well as their relative sequence and location with respect to the shoulder of the key. During the course of normal usage of such a key duplicating machine, normal wear and tear affect the positioning function of the follower element, as well as the depth of cut produced by the cutting wheel. Such normal wear and tear may reach a point where the alignment and coordination of function of the follower and the cutting wheel is no longer precise enough to produce a commercially acceptable duplicate key. This condition can occur many times during the operating life of both the cutter wheel and the follower element and long before the wear on these two parts has reached the point where replacement is necessary.

Heretofore, the operator of the key machine was usually unaware that the wear on the machine had reached the point where adjustment was required, until he began receiving complaints and returns from customers whose duplicate keys would not function satisfactorily. Then the operator would attempt to make some hit-or-miss adjustment of the machine in an effort to restore the machine to its precision duplicating function, hoping that his adjustment would be satisfactory, but still essentially relying on customer's returning poorly made duplicates as a measure of whether the machine had been properly adjusted by him or not. Furthermore, when the wear on the cutting wheel finally reached the point where the cutting wheel had to be replaced, the operator had no precise way of determining what adjustment to make to the machine after discarding the old wheel and replacing it with the new one. Again, his primary reliance was upon the return of faulty duplicate keys by customers as an indicator that further adjustment of the machine was required. This, of course, not only involved poor customer relations, but also involved additional time and expense to the locksmith to remake the keys which had been improperly duplicated.

SUMMARY OF THE INVENTION

The invention herein described provides a precise yet inexpensive and convenient means for periodically calibrating a key duplicating machine for the purpose of checking whether the machine is in proper adjustment to meet commercially acceptable key duplicating tolerances. It substitutes a precision gauge for the cut key in the clamp of the machine and then, by cutting a key blank, using the gauge as a pattern, the requirement for any adjustment can quickly be ascertained and a compensatory adjustment made as required.

It is thus a primary object of the invention to provide precision gauge means for the calibration of a key duplicating machine to meet commercially acceptable standards of duplication.

Other objects and advantages of the invention will become apparent during the course of the following description and with reference to the accompanying drawings, in which like reference characters denote like parts of the same.

DESCRIPTION OF THE PREFERRED EMBODIMENT

Figure 1:
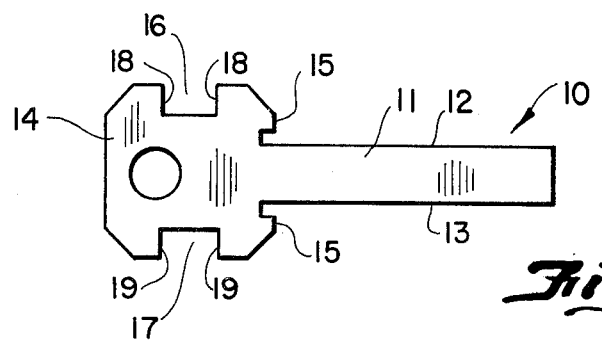
FIG. 1 is a plan view of a calibration gauge embodying the features of the invention.
Figure 2:
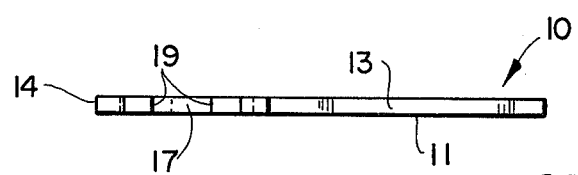
FIG. 2 is a side view of the gauge shown in FIG. 1.

Referring more particularly to FIGS. 1 and 2 of the drawings, the gauge 10 includes a stem portion 11 having parallel longitudinally extending linear edges 12 and 13, which are spaced from each other to provide a width dimension for the stem which is slightly less than that of the narrowest key blank which is ordinarily and customarily duplicated by the type of key duplicating machine previously described. The stem projects centrally from a co-planar head portion 14 which defines co-linear shoulders or abutments 15 extending transversely and normal to the longitudinal axis of the stem on either side of the edges thereof.

The head 14 is recessed or notched as at 16 and as at 17, with the notch 16 having uniformly spaced parallel edge portions 18 defining a predetermined gap or space therebetween which is slightly greater, e.g. 0.003 inches greater, than the gap or space defined between the spaced parallel edges 19 of the notch 17. Although two separate notches 17 and 18 have been illustrated, it will be understood that the notches could be combined into a single stepped notch, if desired. The width of the notch 16 is substantially identical to the width of the stem 11.

In contrast to the relatively soft aluminum or brass normally used in the manufacture of key blanks, the gauge 10 is made of hardened steel so as to resist wear and abrasion.

Figure 3:
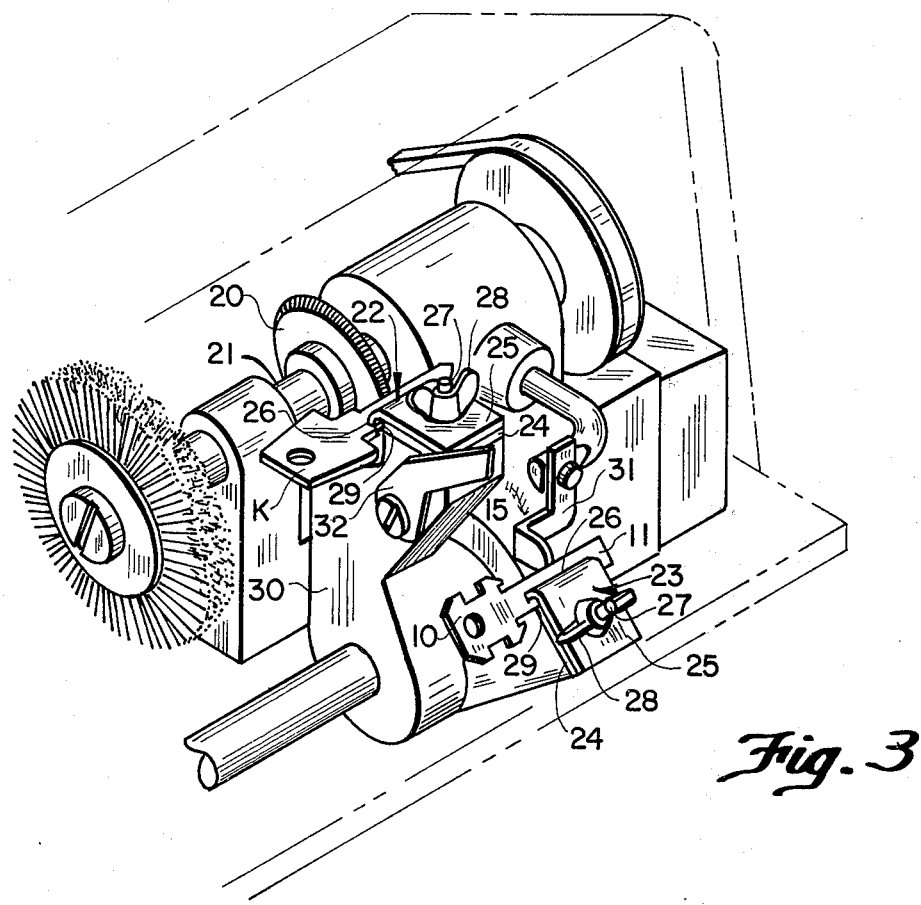
FIG. 3 is an isometric schematic representation of the principal components of a representative key duplicating machine with a gauge and key blank mounted thereon, for the purpose of indicating the manner and function of the described calibration gauge.

Referring to FIG. 3 of the drawings, there is schematically illustrated a rotary key-cutting wheel 20 mounted on a shaft 21 for selective cutting engagement with a key blank K which is secured in a key clamp 22. For purposes of distinguishing the key clamp 22 from the other key clamp 23, in which the gauge 10 is mounted, the key clamp 22 will sometimes be referred to as the duplicate clamp and the clamp 23 will be referred to as the original clamp. Although the clamps 22 and 23 may take various forms, as herein illustrated, each includes a base plate 24 having an overlying adjustable clamping jaw 25 at opposite edges of which are downwardly turned flanges or lips 26 for engagement with the surface of the base plate. A threaded bolt 27 extends upwardly from the base plate 24 through the clamping jaw 25 and its projecting end is threadedly engaged by a wing nut 28 by means of which clamping securement of the jaw can be selectively adjusted. The upper surface of the base plate 24 has an abutment or ledge 29 provided thereon and extending in a direction substantially parallel to the axis of the shaft 21. The ledge 29 is spaced inwardly from the inboard edge or flange 26 of the clamping jaw and provides an upstanding wall against which an edge of a key or the edge of the gauge 10 can be abutted or seated to properly position the gauge or a key for securement by the clamping jaw 25. Both the duplicate clamp 22 and the original clamp 23 are fixedly secured to a pivotally mounted rocker assembly 30 for concurrent movement therewith. The rocker assembly is customarily spring-loaded to yieldably urge the duplicate clamp 22 toward the cutting wheel 20 during operation of the key duplicating machine.

A key guide or follower 31 is adjustably secured to a fixed portion of the duplicating machine and is so disposed as to engage the cuts on an original key which normally is secured in the clamp 23 and provides the pattern for the cutting of the key blank K. The follower is positioned to oppose the spring-induced movement of the rocker assembly 30 towards the cutting wheel 20, so as the follower engages the cuts on the original key it permits the rocker arm to advance toward the cutting wheel and make a corresponding depth of cut in the key blank K and, conversely, as the original key traverses the follower and causes the follower to ride up on a ward of the original key, the rocker arm is displaced by the follower to diminish the engagement of the cutting wheel with the key blank or to withdraw it sufficiently to eliminate any cutting action whatsoever on the key blank K.

A movable shoulder stop 32 is pivotally secured to one of the clamps or to the rocker assembly, and is movable toward or away from each of the clamps to provide a movable abutment for precision positioning of the shoulder of the key blank K to correspond with the like positioning of the shoulder of the original key or, as here indicated, with the shoulder 15 of the gauge 10. Thus the ledge or abutment 29 establishes corresponding identity of cutting position of the key blank K with the original key or the gauge 10, and the shoulder stop 32 establishes identity of longitudinal location of the key blank K in correspondence with the original key or the guage 10.

As previously noted, this brief description of the prior art structure of a key duplicating machine is merely representative and it will be understood that there can be and are numerous variations in the structure and arrangement of the parts, as well as in their operation, but all substantially based upon the principle of operation above described. In testing the key duplicating machine, the gauge 10 is placed in the clamp 23 with one edge of its stem 11 in abutment with the ledge 29 of the clamp and with the longitudinal position of the gauge located by bringing its shoulder 15 into abutment with the movable shoulder stop 32. The clamp 23 is then tightened by means of the wing nut 28 to secure the gauge. A key blank K is similary located, positioned and secured in the duplicate key clamp 22. Both the gauge 10 and the key blank K are thus secured for concurrent, simultaneous movement with the rocker assembly 30 which, as previously indicated, has a rocking movement fore and aft with relation to the follower and cutting wheel, as well as a traversing movement parallel to the shaft 21 which ordinarily results in the cutting of the key blank K in a direction from its shoulder toward the tip of its stem.

With the key blank and gauge so positioned and secured, the key duplicating machine is actuated to initiate a cut on the key blank as determined by engagement of the follower 31 with the straight edge 12 or 13 of the gauge stem 11. As previously indicated, the width of the stem 11 is substantially the same as the width of the narrowest key blank to be cut and represents the width of the key blank stem after the deepest cut is made thereon, as predetermined by the manufacturer of the original key.

When the test cut has been made in the key blank K, the key blank is removed from the clamp 22 and, without removing the gauge 10 from its clamp 23, the cut portion of the stem of the key blank is inserted in the notch 16, square to the edges 18 thereof. If the key duplicating machine is in proper adjustment for cutting, the stem of the key blank will enter notch 16. However, this gauging procedure merely establishes that the cut is sufficiently deep to meet commercially acceptable requirements; it does not necessarily indicate that the cut may not be too deep. Therefore, the cut stem of the key blank is now inserted in the notch 17 square to its edges 19 and, inasmuch as this notch is slightly narrower than notch 16 and establishes the limit for the maximum depth of cut on the key blank, the cut stem should not be able to enter the gap of the notch 17. Therefore, if the cut stem of the key blank is narrow enough to enter the notch 16 and too wide to enter the notch 17, the key duplicating machine is in adjustment and is making a proper depth of cut. It will be understood that both the notches 16 and 17 can be provided with suitable indicia, such as "GO" and "NO GO" to indicate their function and use, as visually their difference in dimension is so slight as not to be readily discernible.

If the cut key blank stem is too wide to enter the notch 16, it indicates that the machine is out of proper adjustment and that the cut must be made deeper. To accomplish this, the follower 31 is adjusted, while it is engaging the edge of the gauge stem 11, to bring the rocker assembly and key clamp 22 slightly closer to the cutting wheel 20, to the extent visually indicated by the over size of the cut key blank stem with respect to the notch 16. After this follower adjustment has been made, another cut can be made in the same key blank K or in another identical key blank K and this new cut again gauged in the notch 16. IF the previously made adjustment of the follower 31 has been sufficient to reduce the width of the cut key stem so that it enters the gauging notch 16, the key stem is then gauged in the notch 17 as previously described. If the adjustment has been such that the cut has been made too deep, the cut key stem will enter the notch 17 and further adjustment of the follower 31 will be required. The follower 31 is then adjusted to move the rocker assembly and clamp 22 slightly away from the cutting wheel. A new cut is made, after this adjustment and, if the adjustment has been properly made, the cut key blank stem should now enter the gauge notch 16 and be too wide to enter the gauge notch 17. It will be understood that extremely fine adjustments of the follower are possible, so that ordinarily no more than two adjustments of the follower will suffice for calibration of the depth of cut of the key duplicating machine.

It will be apparent from the above described procedure that if the initial test cut made is narrow enough to enter the notch 17, then the initial cut is too deep and the first adjustment which will be made on the follower 31 will be for the purpose of retracting the rocker assembly and clamp 22 slightly from the cutting wheel 20.

The testing procedure and adjustment described above will permit calibration of the cutting depth of the key duplicating machine, such as might result from wear of the follower 31 or the cutting wheel 20 or as might occur as a result of wear on the general portions of the shaft 21 or as might occur from some slight misalignment or deformation of the parts of the machine. Obviously, the same test procedure and adjustment is used when either the follower 31 or the cutting wheel 20 have to be replaced.

The above described test procedure for calibration of the cutting depth of the machine is the most important use of the gauge and is used most frequently. However, it is also of importance to make occasional tests to calibrate the longitudinal correspondence between the follower 31 and the cutting wheel 20 with respect to the gauge and a key blank, as well as the longitudinal correspondence of the gauge and key blank with respect to the movable shoulder stop 32. To accomplish this, a second gauge 10 or, in lieu thereof, a shouldered key blank, is secured in the duplicate key clamp 22 with its shoulder 15 in abutment with the end of the ledge 29 of the clamp. The gauge 10 in the clamp 23 is similarly secured with its shoulder in abutment with the end of the ledge 29 of that clamp. The cutting wheel or the machine need not be operated during this test procedure. The movable shoulder stop 32 is then manipulated to determine if it aligns with the shoulders of the gauges 10 when each of the gauges is in abutment with the end of its respective ledge 29. If the shoulder stop 32 does not align with both gauges, as it is manipulated, then it is necessary to slightly bend or deform the shoulder stop until such desired alignment is achieved. This will establish that there will be correspondence of position of the shoulders of the original key and the key blank when secured in their respective clamps against the ends of the ledges 29 or when positioned by means of the movable shoulder stop 32.

The rocker assembly is now shifted to bring the clamp 22 toward the non-running cutting wheel and bring the shoulder 15 of the gauge 10 or of the shouldered key blank in the clamp 22 into alignment with the cutting side of the cutting wheel 20. If there is proper longitudinal correspondence between the follower 31 and the cutting wheel 20, the shoulder 15 of the gauge in clamp 23 should now be aligned with the operative end of the follower. If this condition of alignment does not occur, then the position of the follower is adjusted to bring it into proper alignment. This test procedure and adjustment assures that the follower will engage the orignial key at the same relative longitudinal point on the key as will be engaged by the cutting wheel, if the respective key and blank are properly longitudinally located in their respective clamps, as established by the immediately preceding alignment test of the shoulder stop.

An opening 33 may be provided in the head 14 of the gauge 10 for conveniently hanging the gauge on a key rack close to the key duplicating machine, so it will be readily available to conduct the periodic cutting depth test first described.

The gauge 10 thus permits three calibration procedures to be performed on the key duplicating machine to assure proper cutting depth, proper positioning of the original key and of the key blank, and correspondence or coincidence of operating contact between the cutting wheel and the follower on the pieces respectively engaged thereby.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. A calibration device for a key duplicating machine comprising an elongated stem of hard flat metal having marginal longitudinally extending spaced parallel edges, a head extending transversely to said stem at one end thereof to provide co-linear shoulders extending normal to said edges at said end of said stem, said stem being adapted to be clamped in position to have one of said edges engaged by a follower on the machine, and at least one of said shoulders being engageable with an abutment provided therefor on said machine, and depth-of-cut gauging means provided on said head, including a first notch of predetermined width to establish a limit for the minimum depth of cut on a key blank and a second notch of a predetermined width less than the width of said first notch to establish a limit for the maximum depth of cut on a key blank.

* * * * *